UNITED STATES PATENT OFFICE.

FRIEDRICH BREYER, OF KOGEL, NEAR SIEGHARTSKIRCHEN, AUSTRIA-HUNGARY.

PROCESS OF MAKING SUGAR FROM BEETS.

SPECIFICATION forming part of Letters Patent No. 718,692, dated January 20, 1903.

Application filed March 20, 1900. Serial No. 9,403. (No specimens.)

*To all whom it may concern:*

Be it known that I, FRIEDRICH BREYER, a subject of the Emperor of Austria-Hungary, residing at Kogel, near Sieghartskirchen, in the Province of Lower Austria, in the Empire of Austria-Hungary, have invented certain new and useful Improvements in the Manufacture of Sugar from Beet-Roots; and I do hereby declare the following to be a full, clear, and exact description of the invention, such as will enable others skilled in the art to which it appertains to make and use the same.

This invention has relation to the manufacture of sugar from beet-roots; and it has for its object a process whereby the conversion of the roots into a product ready for conversion into sugar is materially simplified and expedited and a final saccharine solution obtained ready for conversion into fined or marketable table sugar.

The invention lies, essentially, in reacting upon beet-root chips with lime in such proportion that the diffusion product will be slightly alkaline; in diffusing the limed chips at a comparatively low temperature; in defecating the diffusion products at the temperature at which they leave the diffuser—that is, without reheating by admixture therewith of a pulverulent and indifferent inorganic substance and filtration; in decolorizing the defecated juice by reacting thereon with lime at a suitable temperature, and in finally desalting the decolorated juice by admixture with pulverulent char, boiling, and filtration, the final fined filtrate being then ready for conversion into fined marketable table-sugar.

In practically carrying out my invention I preferably proceed as follows: The beet-root chips as they come from the cutters are allowed to drop into an open mesh or perforated basket contained in a bath of hydrate of lime containing about 0.3 per cent. of lime, by weight, of chips. I have found that if the reaction is carried out at a suitably low temperature the subsequent diffusion takes place in a more rational manner. I therefore effect the reaction at a temperature below 50° centigrade, preferably at about 41° centigrade, and then diffuse the limed chips at substantially the same temperature. This step may be called the "first edulcoration," whereby certain cellular constituents of the root are dissolved. I then complete the diffusion of the residuary cellular tissues by drawing off the juice and again reacting upon the residue with about five ten-thousandths parts of lime, by weight, at a temperature of about 75° centigrade. The diffusion products are now defecated at the temperature at which they leave the diffusers by mixing therewith from one per cent. to 1.5 per cent. per volume of a pulverulent and indifferent inorganic substance—as alumina, brick-dust, kieselguhr, or the like—and by filtration. The filtrate thus freed from organic bodies still contains coloring-matter and inorganic bodies—namely, salts—in solution. The filtrate is first decolorized by treatment with about 0.25 per cent., by weight, of lime at a temperature of about 100° centigrade, after which the juice is saturated. It is then free from non-saccharine constituents, except salts in solution, is of a slight yellowish color, does not yaw, and can now be desalted. This I have found can be most thoroughly effected by filtration after boiling the juice with pulverized char for a sufficient length of time. After desalting the juice is ready for conversion into refined or marketable table sugar.

It will be observed that my invention comprises the following characteristic steps: First, the liming of the beet-root chips at a temperature below 50° centigrade; second, the diffusion of the limed chips at a temperature below 50° centigrade; third, the removal of the juice and the reliming of the solid residues and the rediffusion thereof at a higher temperature, and, fourth, the desalting of the defecated juice by admixture with carbon, by boiling the mixture to crystallize out the salts, and by filtration. Obviously the last-named feature or step is applicable to any other process.

Having thus described my invention, what I claim as new therein, and desire to secure by Letters Patent, is—

1. In the manufacture of sugar from beet-roots, the improvement which consists in reacting upon beet-root chips with hydrate of lime in such proportion that the diffusion product will be slightly alkaline, diffusing the limed chips at a temperature not above 50° centigrade, defecating the diffusion products at the temperature at which they leave the diffuser by admixture therewith of a pulverulent and indifferent inorganic substance and by filtration, decolorizing the defecated filtrate by reacting thereon with lime at a suitable temperature, and removing the salts by admixture with the decolorated juice of pulverized char and by boiling and by filtration, substantially as set forth.

2. In the manufacture of sugar from beet-roots, the process which consists in reacting upon the beet-root chips with lime in such proportion that the diffusion product will be slightly alkaline, effecting the reaction at a temperature not above 50° centigrade, subjecting the limed chips to a partial diffusion at a temperature below 50° centigrade, drawing off the juices, adding another quantity of lime to the residues, diffusing the same at a higher temperature, defecating the products of diffusion at the temperature at which they leave the diffuser, decolorizing the defecated juices by means of lime at a temperature of about 100° centigrade, and desalting the decolorized juices by admixture therewith of char, boiling and filtration, substantially as and for the purposes set forth.

3. The step in the manufacture of sugar from beet-roots which consists in reacting on the beet-root chips with lime in about the proportions set forth and at a temperature below 50° centigrade partially diffusing the limed chips at a temperature below 50° centigrade, removing the juice, adding lime to the residue in about the proportions specified and diffusing at a temperature above 50° centigrade, substantially as and for the purposes set forth.

In testimony that I claim the foregoing as my invention I have signed my name in presence of two subscribing witnesses.

FRIEDRICH BREYER.

Witnesses:
ALVESTO S. HOGUE,
AUGUST FUGGER.